United States Patent [19]
Assenmacher

[11] 4,040,763
[45] Aug. 9, 1977

[54] METHOD AND FIXTURE FOR REAMING PISTON PIN BUSHINGS IN CONNECTING RODS

[76] Inventor: Gerhard Assenmacher, 5725 Olde Stage Road, Boulder, Colo. 80302

[21] Appl. No.: 626,050

[22] Filed: Oct. 28, 1975

[51] Int. Cl.² .................. B23B 35/00; B23B 41/12
[52] U.S. Cl. .................. 408/1 R; 33/180 B; 408/79; 408/707
[58] Field of Search .......... 408/707, 79, 82, 1; 269/47, 51, 52; 33/180 B, 180 TR, 180 R

[56] References Cited

U.S. PATENT DOCUMENTS

| | | | |
|---|---|---|---|
| 1,604,940 | 10/1926 | Hempy | 408/79 |
| 1,637,508 | 8/1927 | Aab | 33/180 X |
| 1,763,917 | 6/1930 | Aab | 408/707 X |
| 1,810,214 | 6/1931 | Johnson | 408/79 |
| 1,905,102 | 4/1933 | Johnson | 33/180 X |
| 2,218,380 | 10/1940 | Evans | 408/707 X |
| 2,731,858 | 1/1956 | Evans | 408/79 |
| 2,844,053 | 7/1958 | Wagner et al. | 408/79 X |

Primary Examiner—Francis S. Husar
Assistant Examiner—William R. Briggs
Attorney, Agent, or Firm—Charles W. Helzer

[57] ABSTRACT

The invention discloses a fixture for holding the connecting rod from an internal combustion engine for the purpose of precision reaming the bushing in the piston pin end of said connecting rod. The fixture is uniquely adaptable to various connecting rod lengths by simply rotating an eccentric member to an appropriate index position. Various crankshaft diameters can be accommodated by the use of appropriate adapter sleeves on the eccentric bushing. Different size piston pin diameters may be accommodated by simply inserting the proper reamer guide bushing and use of an appropriate diameter conical centering bushing. Additional holes also can be provided in an indexing plate member of the fixture to extend the range of connecting rod lengths that can be handled with the fixture. The fixture is also adapted to be made with a blank indexing plate member, which can be drilled by the user for various connecting rod lengths.

16 Claims, 12 Drawing Figures

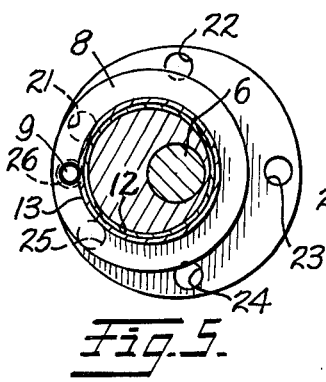
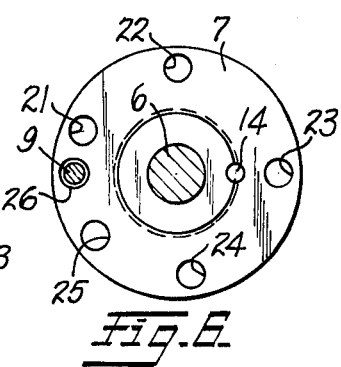
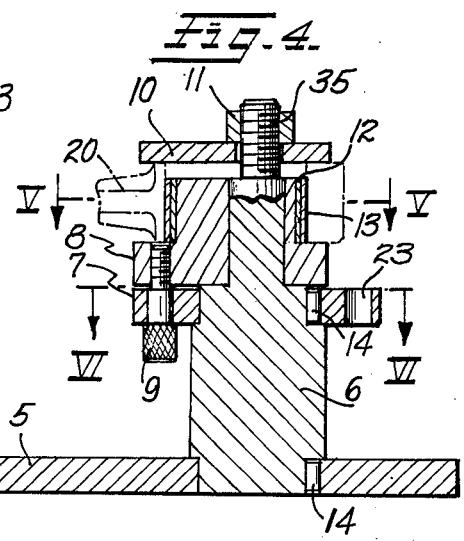
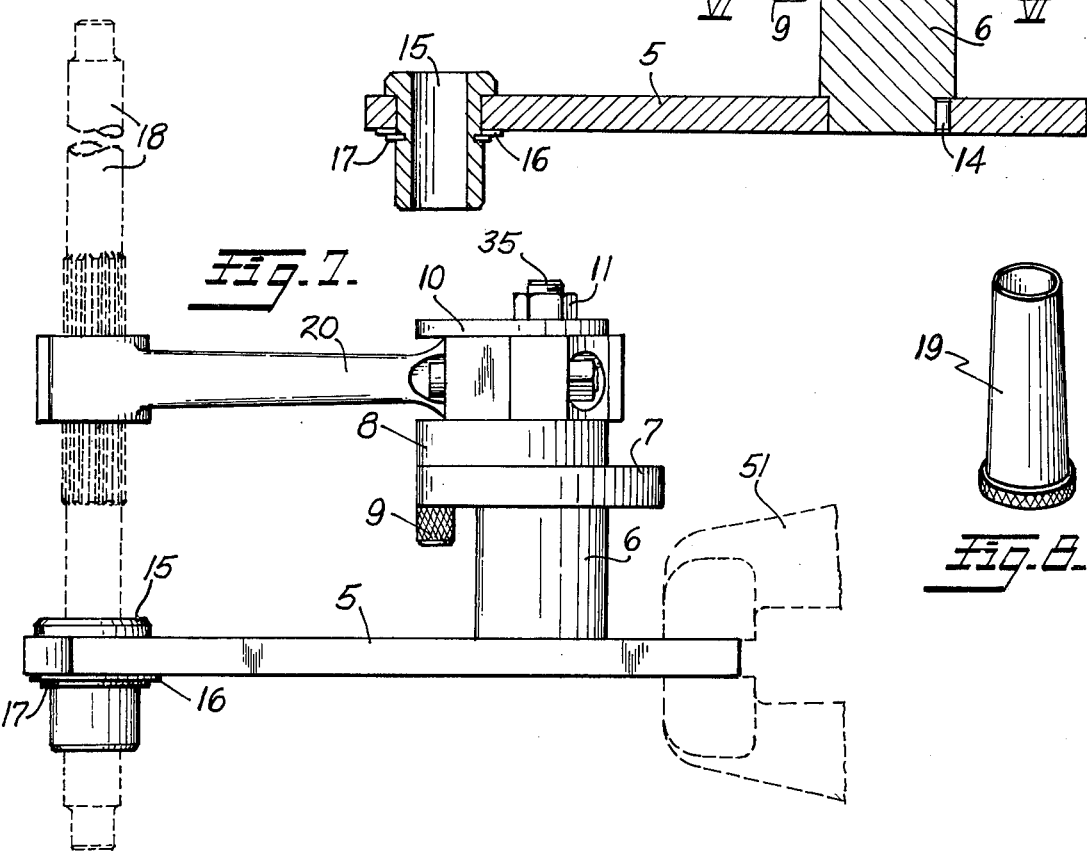
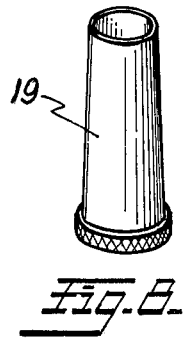
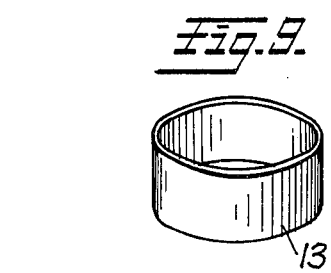
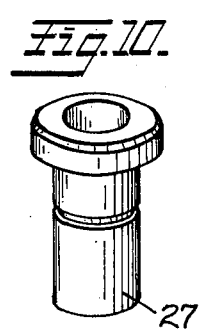
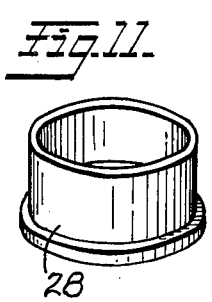

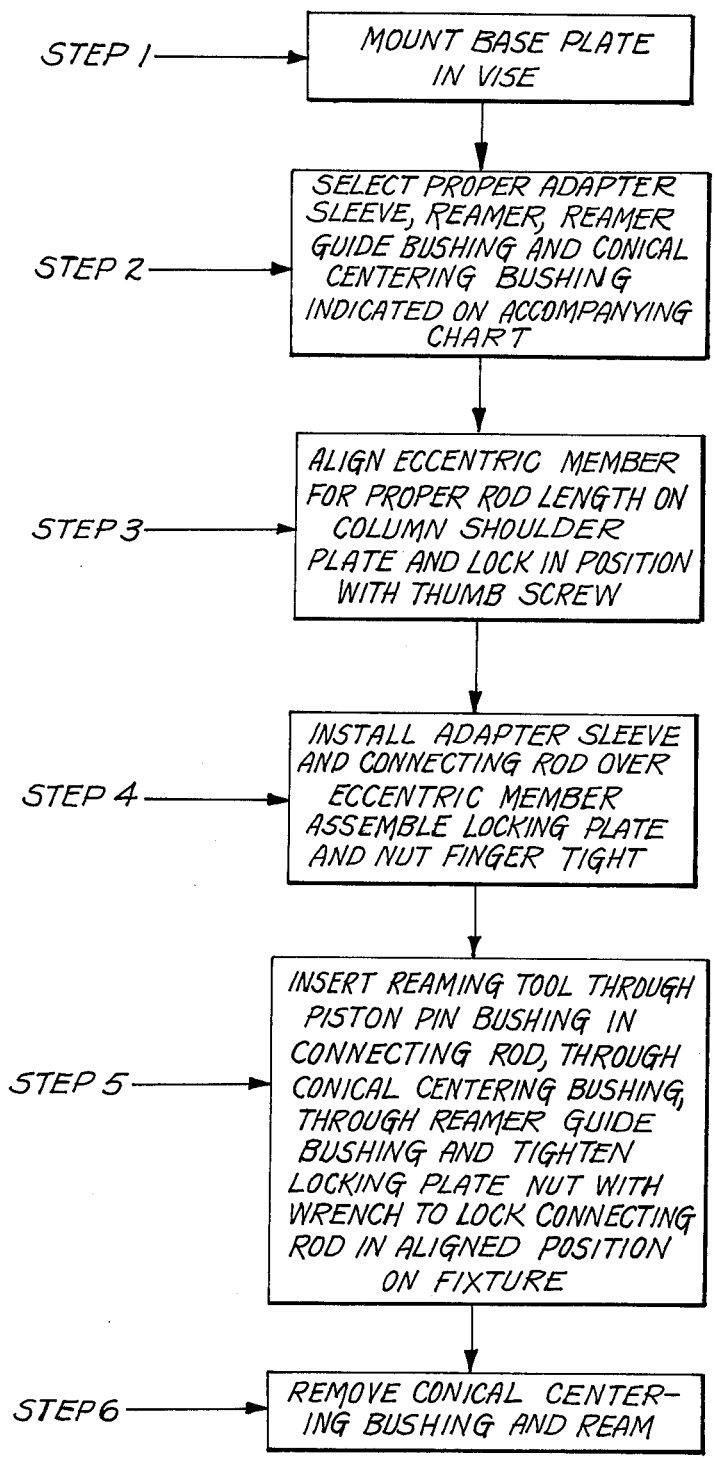

METHOD AND FIXTURE FOR REAMING PISTON PIN BUSHINGS IN CONNECTING RODS

CROSS REFERENCE TO RELATED APPLICATIONS

Applicant has filed a disclosure document under the Disclosure Document Program as described in item 207, page 59, Consolidated Listing of Jan. 1, 1975.

BACKGROUND OF THE INVENTION

1. Field of the Invention

This invention is in the field of cutting or reaming by use of a rotating axially moving tool wherein a precalibrated guide fixture is provided for ready use by a machinist for reaming the piston pin end bushings of connecting rods having various different lengths as well as different crankshaft and piston pin journal diameters.

In the light of the great variety of imported automobices in the United States, such as Volkswagen, Toyata, Capri, Opel, etc., which require expert engine maintainence, there is now a great need for precision engine rebuilding especially in view of the emphasis on energy conservation. Repair and rebuilding are obviously more most efficient and energy efficient for the small economy cars than scrapping and disposing for new replacement. Accordingly, there is a great need for more accurate and easily used labor efficient tools and work holders to serve in engine rebuilding, particularly the imported engines.

2. Description of the Prior Art

The following United States patents are deemed to be of interest with respect to the present invention.

| Patent No. | Issue Date | Title |
|---|---|---|
| 1,331,052 | February 17, 1920 | Machine for Truing Connecting Rod Bearings |
| 1,369,472 | February 22, 1921 | Parallel Alignment Fixture |
| 1,520,623 | December 23, 1924 | Device for Boring Connecting Rods, etc. |
| 1,592,617 | July 13, 1926 | Boring Mechanism |
| 1,622,560 | March 29, 1927 | Aligning Machine for Connecting Rods, etc. |
| 2,137,484 | November 22, 1938 | Connecting Rod Aligner |
| 2,349,526 | May 23, 1944 | Boring Machine |

From a review of the above-listed patents, one can determine that the art of precision reaming bushings in connecting rods is quite well developed. However, all of the above-mentioned patents are concerned with reaming out the crankshaft or driveshaft ends of connecting rods and not the piston pin ends.

Pat. No. 2,137,484, for example, discloses a fixture for holding connecting rods of different lengths with a sliding plate 34.

Pat. No. 1,331,052 discloses a similar arrangement employing a longitudinal slide 7.

Pat. No. 1,369,472 discloses a pivoted lever type of arrangement for accommodating different connecting rod lengths.

Pat. No. 1,520,623 discloses a fixture employing an elongated slot 9 for accommodating different connecting rod lengths.

In contrast to the prior art devices, the present invention provides a fixture which may be mounted in a common bench vise and which employs a rotatable eccentric member that adapts the fixture in an ingeneous manner by a simple rotational movement of the eccentric member to allow for the precision reaming of the bushing in the piston end of various different size connecting rods. The fixture further provides an indexing means and stop means which cooperate with the eccentric member to allow easy and readily repeated rotational movement of the eccentric member to a desired and precise index position for accommodating different length connecting rods. As will be apparent from the following detailed description and drawings, the fixture is extremely versatile and may readily be adapted to accommodate not only different connecting rod lengths but also various reamer shank diameters and various sizes of crankshaft journals as well and may be easily and repeatedly adapted to work of any new dimensions within reasonable constraints.

SUMMARY OF THE INVENTION

The invention comprises a fixture and method for reaming piston pin bushings in connecting rods for internal combustion engines. The fixture comprises a base plate having a support column on one end thereof which is fitted with rotatable eccentric means formed by an eccentrically mounted member. The eccentrically mounted member is rotatable with respect to an indexing plate provided with hole which cooperate with a pin or other securing means for holding the eccentric member in various rotational positions relative to the indexing plate. The remaining end of the base plate is fitted with a bushing in which the end of a conventional reaming tool may be journaled. The eccentrically mounted member may be rotated to any precalibrated rotational position relative to the base plate and then fixed with a pin to thereby readily adapt the fixture for use with various lengths of connecting rods in a manner which can be accurately repeated with ease. The mounting of a connecting rod on the column over the eccentrically mounted member is effected by removing and resetting a locking plate and nut. Connecting rods having various size crankshaft journals are adapted by the use of various size sleeve bushings slipped over the eccentrically mounted member to increase its journal diameter to an appropriate size. Connecting rods having different size piston pin journal diameters are accommodated by selecting an appropriate size reamer shank diameter and conical guide bushing as will be described more fully hereafter

OBJECTS OF THE INVENTION

An object of the invention is to provide an easily used, precise and mechanically strong fixture for reaming the piston pin bushing in a connecting rod and which is designed for use in an engine repair garage by an automobile mechanic or other skilled machinist using his existing skills.

A further object is to provide a new method for reaming the piston pin end of connecting rods using the fixture of the invention which does not require a substantial investment in expensive machine tools, and which can be utilized by automobile repair mechanics and the like in small auto repair shops without requiring any additional or special training.

BRIEF DESCRIPTION OF THE DRAWINGS

The objects, advantages and meritorious features of the invention will become more apparent from the following description of the preferred emobodiment, appended claims and accompanying drawings wherein similar parts in each of the several figures are identified by the same reference numeral; and wherein:

FIG. 4 is a vertical view, taken on the line IV — IV of FIG. 3;

FIG. 5 is a horizontal sectional view, taken on the line V — V of FIG. 4;

FIG. 6 is a horizontal sectional view, taken on the line VI — VI of FIG. 4;

FIG. 7 is a side elevational, similar to FIG. 2, showing the fixture adjusted for a minimum length connecting rod and with the conical centering bushing removed and the reamer in working position;

FIGS. 8, 9, 10 and 11 are perspective views of various different sizes of a conical guide bushing, an adapter sleeve bushing, a reamer guide bushing and an adapter sleeve bushing with shoulder, respectively, used in practicing the invention; and FIG. 12 is a functional block diagram outlining the basic steps of a novel reaming method which employs the fixture of FIGS. 1-11.

DETAILED DESCRIPTION OF PREFERRED EMBODIMENT

Figure 1:
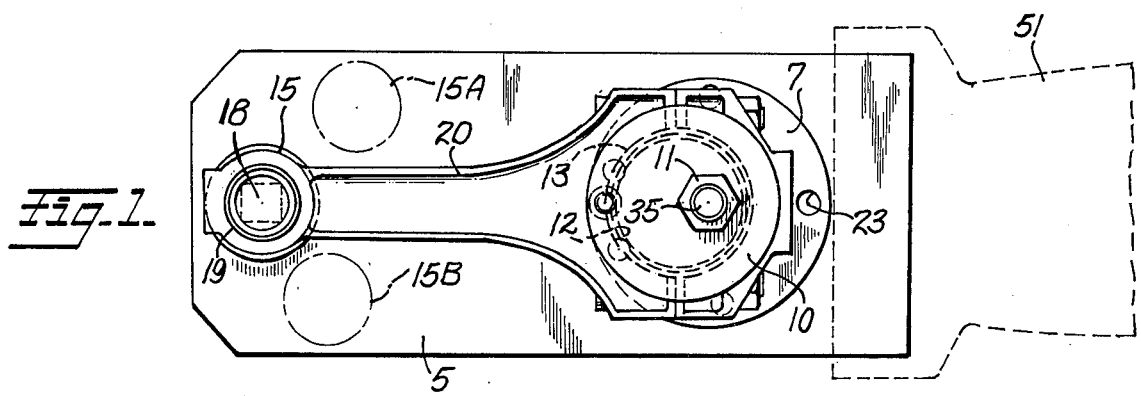
FIG. 1 is a plan view of the reaming fixture of the present invention and shows a connecting rod mounted on the fixture for reaming in accordance with the invention.
Figure 2:
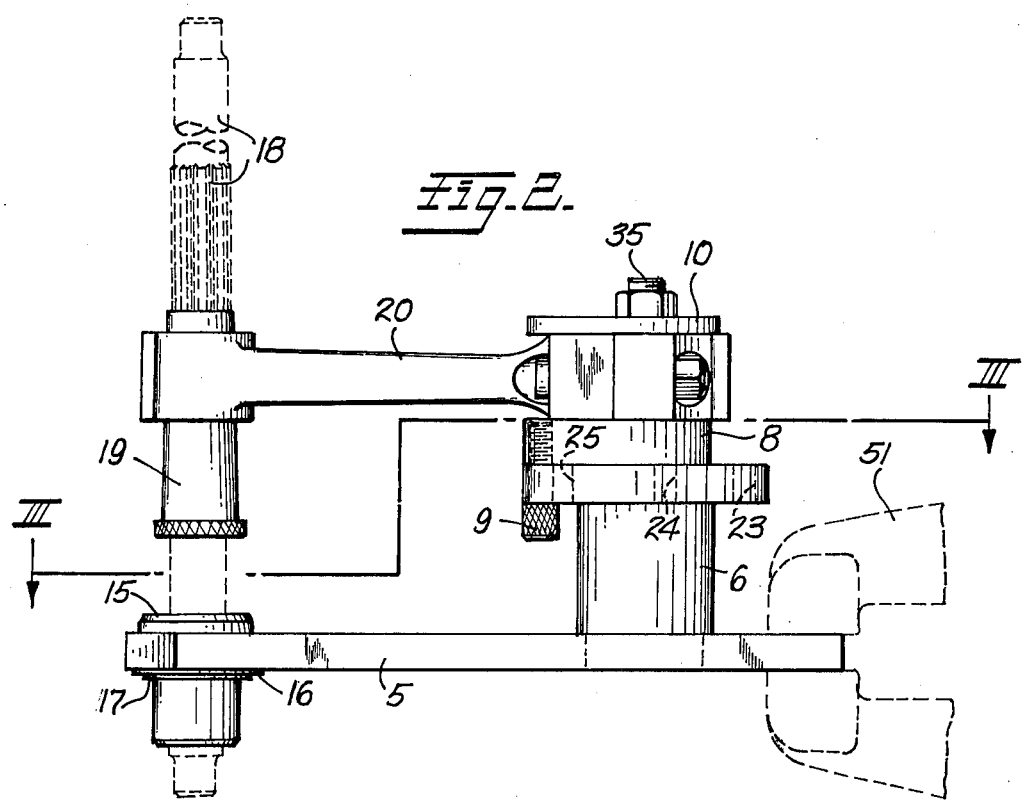
FIG. 2 is a side elevational view of the fixture of FIG. 1 and shows a reaming tool and conical centering guide bushing used in aligning the fixture.
Figure 3:
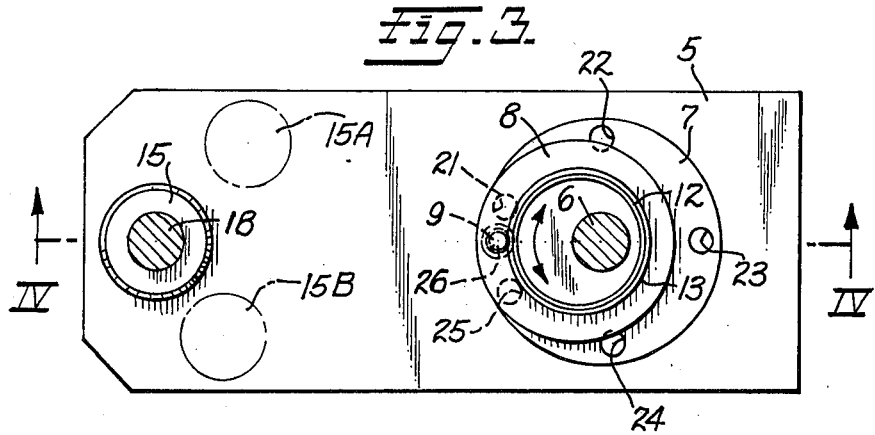
FIG. 3 is a plan view of the fixture, similar to FIG. 1, partly broken away along line III — III of FIG. 2, and showing the fixture adjusted to receive a connecting rod of minimum length.

As shown in FIGS. 1-5, the reaming fixture of the invention comprises a relatively thick steel base plate 5 of generally elongated rectangular construction having support column means 6 mounted at one end thereof as best shown in FIG. 2. The support column 6 comprises a relatively large diameter solid steel cylindrical shank press fit and pinned into base 1 with a lower dowel pin 14. A reamer guide bushing 15 is mounted in a reamer guide bushing mounting means comprised by a circular opening in the opposite end of base plate 1. A reamer guide bushing of suitable diameter is mounted in the opening by means of a washer 16 and snap ring 17 and is relatively long so as to extend down below the bottom side of the base plate 1 as shown at 15 in FIG. 2. The mouth of the bushing 15 and the support column 6 projects above the top surface of base plate 1 as best seen in FIG. 2.

Secured to the upper end or top of support column 6 is a rotatable eccentric means comprised by a cylindrically-shaped eccentric member 8 having an enlarger diameter lower portion and a smaller diameter upper portion as best seen in FIG. 4 of the drawings. The eccentric member 8 has an axial opening formed therein through which an upper, smaller diameter threaded portion 35 of support column 2 passes. This upper, smaller diameter threaded portion 35 is for receiving a locking nut 11. The upper, smaller diameter threaded portion 35 of column 2 is formed about a central axis passing through the column 2. The axial opening in the eccentric member 8, however, including both the large diameter position and smaller diameter upper portion, is formed through an off-center axis. This feature is best seen in FIG. 5 of the drawings wherein it will be appreciated that rotation of the cylindrically-shaped eccentric member 8 about the off-center axis formed by the upper smaller diameter threaded protion 35 of support column 2, will cause the member 8 to function in the manner of an eccentric.

The eccentric member 8 is supported for rotation on a shoulder formed in the support column 2 by the juncture of the smaller diameter upper portion and the larger diameter lower portion of column 2. Immediately below this shoulder, a second, smaller shoulder is formed in the lower, larger diameter portion of support column 2 which receives a circular shaped indexing plate member 7 secured in fixed relationship with respect to the support column 2 and base plate 1 by means of an upper dowel pin 14. The indexing plate member 7, as best shown in FIG. 6 of the drawings, has a plurality of openings or holes 21-26 formed therein which are arrayed around its periphery. These holes are designed to be aligned with a coacting threaded opening in the lower surface of the enlarged diameter lower portion of eccentric member 8 and to receive detent means formed by a threaded retaining pin 9 as best seen in FIG. 4. From a comparison of the setting of the eccentric member 8 shown in FIG. 4 to the setting shown in FIG. 7 of the drawings, it will be appreciated that the rotational position setting of eccentric member 8 is determined by which one of the peripheral holes 21-26 the retaining pin 9 is inserted through into the coacting threaded opening of eccentric member 8. Thus, the holes 21-26 in indexing plate member 7 together with the coacting threaded opening in the lower surface of eccentric member 8 form a means providing different predetermined fixed rotational positions for eccentric member 8. The rotational setting thus adjusted determines the distance between the center of the journal formed by the smaller diameter upper portion of eccentric member 8 and the center axis of the reamer guide bushing 15. This in turn determines the length of a connecting rod which can be mounted on the fixtures. In FIGS. 1, 2, 4 and 7, the fixture is illustrated with the eccentric member 8 rotated to its position for accommodating a maximum length connecting rod 20.

In order to accommodate connecting rods having different crankshaft end journal diameters, the fixture of the invention is provided with a plurality of interchangeable cylindrical-shaped bushing sleeves of different wall thicknesses as shown in FIGS. 9 and 11. As best seen in FIG. 4, these bushing sleeves of different wall thicknesses are designed to fit over the smaller diameter upper end of rotatable eccentric member 8. One such adapter bushing sleeve is shown at 13 in FIG. 4. By this means, a suitable bearing surface for firmly retaining the crankshaft end journal of connecting rods being reamed, is provided.

FIGS. 2 and 4 of the drawings taken with FIG. 1 best illustrate the manner in which a connecting rod 20 is supported on the fixture of the invention with the crankshaft journal end of the connecting rod secured over the small diameter upper portion of eccentric member 8 and adapter sleeve 13. The connecting rod 20 is retained on the fixture by means of a locking plate 10 held in place by locking nut 11 threaded over the threaded stud 35 formed on the upper smaller diameter portion of support column 2. The locking plate 10, as best seen in FIG. 1, is of circular configuration but has an axial opening formed through it which is off-center in the same manner as the axial opening in the eccentric member 8. By this arrangement, upon the eccentric member 8 being rotated to any of the different rotational positions 21-26, the locking plate 10 likewise can be rotated in order to firmly fit over the top of the crankshaft journal end of a connecting rod 20 being reamed.

The connecting rod 20 is secured on the fixture with the piston pin end journal centered over the reamer guide bushing 15 as best seen in FIGS. 1, 2 and 7. To assist in aligning the connecting rod on the fixture, a reaming tool shown in dotted outline form at 18, is employed. The reaming tool 18 may be entirely conventional in construction and of the type generally available commercially. The reaming tool 18 will of course have to be selected for an appropriate piston pin bushing inside diameter. Preferably also, the reaming tool will include a small diameter shank portion which will pass through the piston pin hole in the connecting rod upon the tool being fully inserted in the manner shown in FIG. 2 and will have a lower end outside diameter which is precisely journaled within the reamer guide bushing 15 along the full axial length of bushing 15. By thus constructionally relating the reamer guide bushing 15 and the reamer tool 18, precise vertical alignment of the reamer tool can be maintained. As is conventional, the reamer tool 18 is provided with a knurled upper end having either a hexagonal or square shape as shown in FIG. 1 whereby a tool such as a wrench can be employed to rotate the tool during the reaming operation.

In order properly to center the reaming tool 18 in the new piston pin bushing to be reamed, the connecting rod 20 is first initially aligned in the above described manner with the piston pin hole generally centered over the center of the reamer guide bushing 15. A conical centering bushing shown at 19 in FIG. 2 then is employed. In order to accommodate different sizes of piston pin bushing journal diameters, different outside diameter conical centering bushes such as shown in FIG. 8 and different inside diameter reamer guide bushings such as shown in FIG. 10, are employed with the fixture. The conical centering bushing is inserted in the piston pin hole in the manner shown in FIG. 2 in order to accurately center the piston hole of the connecting rod 20 with respect to the center reaming axis of reaming tool 18 upon the latter being placed in the reamer guide bushing 15. With the reaming tool thus properly centered relative to the piston pin hole, the locking plate 10 and locking nut 11 are the firmly set with a wrench or otherwise so that the assembled structure is held rigidly in properly centered alignment. Thereafter, the reaming tool 18 is withdrawn, the conical centering guide 19 is removed, and the reaming tool then reinserted. Reaming of the blank piston pin bushing then will proceed normally by rotating the reamer with a wrench or other suitable tool attached to the square head at the top end of the reamer to thereby properly fit the new bushing.

From the foregoing description, it will be appreciated that the simple geometry of the fixture comprised by base plate 1, support column 2, eccentric member 8 and the manner in which it cooperates with the indexing plate 7, makes available to the industry a relatively simple and inexpensive fixture that facilitates the precision reaming of piston pin bushings for the connecting rods of internal combustion engines. By merely releasing the set screw 9 in indexing plate 7 and rotating the ecccentric member 8 to a desired rotational position relative to one of the additional openings 21-26 in the indexing plate, a unique and precisely indexed adjustment to accommodate the length of a connecting rod to be reamed, is provided by the fixture. This unique and precise indexed adjustment to accommodate different connecting rod lengths, is readily reproduced exactly with each operation of the fixture. This is to be contrasted with the sliding plate arrangements used in prior patents such as U.S. Pat. Nos. 1,331,052 and 2,137,484. The eccentric means employed with the present fixture permits a more efficient and simpler adjustment by a mechanic who uses the fixture, and one which can readily be repeated exactly each time the fixture is used. With respect to the indexing plate member 7, it should be noted in FIG. 6 that only about 6 peripherally arrayed holes 21-26 are provided in the indexing plate. This leaves a number of blank areas which may be drilled by a mechanic to accommodate connecting rod lengths of different dimensions than those accommodated by the predrilled holes 21-26. Further, if desired, the indexing plate 7 may be initially manufactured completely blank without any of the indexing holes 21-26 drilled therethrough. With the fixture comprising the present invention, the eccentric member and indexing plate as well as support column 2 may be disassembled from the fixture by removal of the dowel pins 14. This allows the indexing plate 7 to be removed for ready drilling of additional or new holes such as 21-26. Hence, the indexing plate readily can be modified by a mechanic who uses the fixture to accommodate connecting rods of any desired length. In addition, the press fit and dowel pin mounting result in a structure that is tightly locked into position on the base plate 1 after assembly so as to assure proper reaming with the fixture.

The method of reaming made available by the invention is best understood with relation to FIG. 12 of the drawings. In carrying out the novel reaming method, the fixture described with relation to FIG. 1-11 is used by first clamping the base plate 1 in a suitable holder such as a common bench vise shown in dotted outline form at 51 in FIGS. 1, 2 and 7. This is shown in FIG. 12 as step 1. Thereafter, in step 2, a proper size adapter sleeve such as shown in FIGS. 9 and 11 and a proper size reamer guide bushing 15 is inserted in base plate 1. The proper size adapter sleeve, reamer and reamer guide bushing as well as a proper size conical centering bushing all are identified in a chart which accompanies the fixtures and indicates to the mechanic which size adapter sleeve and which sizer eamer guide bushing and conical centering bushing, is to be employed in connection with the connecting rods of a given engine manufacture. In this regard, it should be noted that one size of reamer guide bushing 15 may be suitable for 90% of the connecting rods to be reamed; however, the remainder may require a guide bushing selected from a graded set of reamer guide bushings of precise reamer diameter corresponding to the diameter of a reamer to be used in reaming the piston pin bushing of the connecting rods of certain engine manufacturers. All bushings of the set fit into the base plate opening provided on base plate 1 to accommodate the reamer guide bushing and are held in place by washer 16 and snap ring 17 so as to permit easy interchangeability in much the same manner as sockets are interchanged in a standard socket wrench.

Step 3 of the novel reaming method is to align the eccentric member 8 with a suitable hole 21-26 in the indexing plate 7, and thereafter to lock the eccentric member in the set position with the thumb screw 9. At this point the appropriate size adapter sleeve 13 for the crankshaft end journal of the connecting rod to be reamed, selected in step 2, is slipped over the smaller diameter upper portion of eccentric member 8. Thereafter in step 4 the crankshaft end journal of the connecting rod is slipped over the appropriate adapter sleeve 13 and the upper smaller diameter portion of eccentric member 8 so as to be journaled thereon in the manner best seen in FIG. 4. The locking plate 10 is then secured over the assemblage and the locking nut 11 turned down only finger tight.

In step 5 of the method the appropriate reaming tool 18, selected in step 2, then is inserted through the piston pin opening in the connecting rod. The conical centering bushing 19 likewise identified on the chart in step 2 is inserted into the piston pin end of the connecting rod from its underside as shown in FIG. 2. The smaller diameter shank portion of reamer tool 18 passes through the piston pin hole in the connecting rod and after passing through the conical centering bushing 19, the lower end of the reamer 18 is seated in the appropriate reamer guide bushing 15 at least to the full axial extent of the reamer guide bushing. With the reamer 18 properly centered and seated in this manner and with the reamer conical centering bushing firmly in place in the piston pin hole of the connecting rod, the lock nut 11 then is tightened down with a wrench or other suitable tool so that the connecting rod 20 is rigidly held in place with the piston pin opening accurately centered over the reamer guide bushing. Thereafter, in step 6 the reamer tool is removed, the conical centering bushing is removed, and the reamer tool reinserted and slowly rotated in a known manner by the mechanic to perform the desired reaming operation accurately and surely as to produce a proper fit in the piston pin bushing.

For certain engines manufactured overseas, it is possible that the range of different connecting rod lengths which the eccentric member 8 can be rotated to accommodate, is insufficient. For example, the eccentric member 8 may be designed in such a manner that it can be rotated to accommodate differences in connecting rod lengths ranging from a minimum of 12.7 centimeters to a maximum of 15.24 centimeters measured from the center of the crankshaft journal end to the center of the piston pin end. In order to accommodate connecting rod lengths falling outside this range, additional openings shown at 15A and 15B in FIGS. 1 and 3 may be drilled in the base plate 5 for accepting reamer guide bushings 15 in the same manner as described above. The centers of the additional openings 15A and 15B are centered at different radial distances from the center of the support column 2. For example, if the center of the solid line opening for reamer guide bushing 15 first described above is at a radial distance of 13.97 centimeters from the center of support column 2, then the additional openings 15A and 15B may be centered at radial distances of 11.43 and 12.7 centimeters, respectively, or any other desired radial distance. If needed, the user of the fixture could drill the additional openings such as 15A and 15B to accommodate particular engines on which he works. In this manner, the range of connecting rod lengths which can be used with the fixture readily may be adjusted by appropriate modification of the fixture to provide additional reamer guide bushing openings such as 15A and 15B.

From the foregoing description, it will be appreciated that the invention provides an easily used, precise and mechanically strong fixture for the accurate reaming of piston pin bushings in connecting rods. The fixture is designed for use in an engine repair garage by an automobile mechanic or other skilled machinist using his existing skills and without requiring any substantial investment in expensive machine tools and the like.

Having described one embodiment of a new and improved reaming fixture and method of using the same in accordance with the invention, it is believed obvious that other modifications and variations of the invention will be suggested to those skilled in the art in the light of the above teachings. It is therefore to be understood that changes may be made in the particular embodiment of the invention described which are within the full intended scope of the invention as defined by the appended claims.

I claim:

1. A fixture for reaming piston pin bushings in connecting rods comprising an elongated base member having support column means secured to one end thereof and at least one reamer guide bushing mounting means on the remaining end thereof; rotatable eccentric means mounted on said support column means supporting the crankshaft journal end of a connecting rod to be reamed; indexing means supported on said base member and including detent means coacting with means providing different predetermined fixed rotational positions for said rotatable eccentric means for setting and fixedly detaining said rotatable eccentric means in a selected one of a number of different predetermined fixed rotational positions, said detent means being readily adjusted to set said rotatable eccentric means in a precise easily reproduced manner to any selected one of said number of different predetermined fixed rotational positions whereby said fixture readily and with precision can be adjusted to accommodate different length connecting rods; and locking means securing a connecting rod to be reamed in position on said fixture with the crankshaft journal end thereof supported on said rotatable eccentric means and the piston pin end centered over the reamer guide bushing mounting means.

2. A fixture according to claim 1 further including a plurality of interchangeable bushing sleeves designed to fit over the rotatable eccentric means for adapting the rotatable eccentric means to different connecting rods crankshaft end journal diameters.

3. A fixture according to claim 1 wherein said rotatable eccentric means comprises a cylindrically-shaped eccentric member rotatably secured on the support column means for rotation about an off-center axis whereby rotation of the member around the off-center axis produces an eccentric effect, the eccentric member having a cylindrically-shaped upper portion designed to journal the crankshaft journal end of a connecting rod to be reamed.

4. A fixture according to claim 3 further including a plurality of interchangeable cylindrical-shaped bushing sleeves of different wall thicknesses desgined to fit over the upper end of the rotatable eccentrically mounted-cylindrical-shaped eccentric member for adapting the rotatable eccentric member to accommodate different connecting rod crankshaft end journal diameters.

5. A fixture according to claim 1 wherein said indexing means comprises a circular-shaped replaceable indexing plate member secured on said support column means adjacent the rotatable eccentric means and having a plurality of openings therein arrayed around its periphery for alignment with a coacting opening in the rotatable eccentric means, and said detent means comprises replaceable pin means coacting with the opening in the rotatable eccentric means and an aligned opening in the indexing plate member for firmly locking the rotatable eccentric means in a desired rotational position.

6. A fixture according to claim 4 wherein said indexing means comprises a circular-shaped replaceable indexing plate member of greater diameter than said rotatable eccentric member and secured on said support column means adjacent the rotatable eccentric member, said indexing plate member having a plurality of openings therein arrayed around its periphery for alignment with a coacting opening in the rotatable eccentric member, and said detent means comprises replaceable pin means coacting with the opening in the rotatable eccentric member and an aligned opening in the indexing plate member for firmly locking the rotatable eccentric member in a desired rotational position.

7. A fixture according to claim 3 wherein said locking means comprises a circular-shaped locking plate member of comparable diameter to the cylindrically-shaped eccentric member and having an off center axial opening through which a threaded stud passes that is secured to the support column means for rigidly clamping the circular-shaped locking plate member in place over a connecting rod crankshaft journal end seated on the cylindrically-shaped upper portion of the eccentric member.

8. A fixture according to claim 6 wherein said locking means comprises a circular-shaped locking plate member of comparable diameter to the cylindrically-shaped eccentric member and having an off-center axial opening through which a threaded stud passes that is secured to the support column means for rigidly clamping the circular-shaped locking plate member in place over a connecting rod crankshaft journal end seated on the cylindrically-shaped uppper portion of the eccentric member.

9. A fixture according to claim 1 wherein the reamer guide bushing mounting means mounts reamer guide bushings of different diameter and further including a plurality of different diameter, conically-shaped centering guide bushings for use in precisely centering the piston pin end of connecting rods having different piston pin end journal diameters over a reamer guide bushing mounted in the base member.

10. A fixture according to claim 8 wherein the reamer guide bushing mounting means mounts reamer guide bushings of different diameter and further including a plurality of different diameter, conically-shaped centering guide bushings for use in precisely centering the piston pin end of connecting rods having different piston pin end journal diameters over a reamer guide bushing mounted in the base member.

11. A fixture according to claim 5 wherein said circular-shaped indexing plate member in addition to the peripherally arrayed openings for the locking pin also includes peripheral areas of blank spaces for accommodating additional openings to be drilled by a user of the fixture to thereby allow the fixture to be adapted for use with connecting rods of non-standard lengths.

12. A fixture according to claim 10 wherein said circular-shaped indexing plate member in addition to the peripherally arrayed openings for the locking pin also includes peripheral areas of blank spaces for accommodating additional openings to be drilled by a user of the fixture to thereby allow the fixture to be adapted for use with connecting rods of non-standard lengths.

13. A fixture according to claim 1 wherein there are a plurality of reamer guide bushing mounting means formed in the elongated base member with each reamer guide bushing mounting means being centered a different radial distance from the support column means.

14. A fixture according to claim 12 wherein there are a plurality of reamer guide bushing mounting means formed in the elongated base member with each reamer guide bushing mounting means being centered a different radial distance from the support column means.

15. A fixture according to claim 5 wherein the periphera areas of said circular-shaped shoulder member are entirely blank to allow a user of the fixture to drill openings at desired peripheral points whereby the fixture can be adapted for use with connecting rods of any length.

16. A method of reaming the piston pin bushing of connecting rods utilizing a fixture comprising a base plate having an eccentric member rotatably secured on a support column at one end and a reamer guide bushing of suitable dimension at the other end; indexing means supported on the base member and including detent means coacting with means providing different predetermined fixed rotational positions for said rotatable eccentric member for setting and fixedly detaining the rotatable eccentric member in a selected one of a number of different predetermined fixed rotational positions whereby the fixture readily and with precision can be adjusted to accommodate different length connecting rods; and locking means including a locking plate and locking nut; said method comprising:

placing one end of the fixture in a vise;

rotating the eccentric member relative to the indexing means to accommodate a particular length connecting rod placing said detent means in means defining said one of a number of fixed rotational positions;

fitting the crankshaft journal end of the connecting rod on the support column over the eccentric member;

fitting an adapter sleeve bushing on said eccentric member (if required) to adapt the eccentric member to accommodate the diameter of the connecting rod crankshaft end journal;

setting said adapter sleeve bushing, connecting rod, and eccentric member only finger tight into rough aligned position with a locking plate and nut to bring the center axis of the piston pin end bushing of the conecting rod roughly into alignment with the center axis of the reamer guide bushing;

inserting a reaming tool through the piston pin end bushing to be reamed, through a conical centering guide bushing and into the reamer guide bushing;

locking the said connecting rod rigidly in place on the eccentric member with the center axis of the piston pin end bushing in accurate axial alignment with the center axis of the reamer guide bushing by turning down the locking nut on the locking plate with a wrench;

removing the reaming tool and the conical centering guide bushing; and thereafter reinserting the reaming tool and reaming out the piston pin end bushing of the connecting rod with high precision.

* * * * *